United States Patent
Kalies

(10) Patent No.: US 7,081,057 B2
(45) Date of Patent: Jul. 25, 2006

(54) DRIVEN PULLEY SYSTEM WITH REMOVABLE CAM

(75) Inventor: Ken Edward Kalies, Richmond, IN (US)

(73) Assignee: GMAC Commercial Finance LLC, Southfield, MI (US)

(*) Notice: Subject to any disclaimer, the term of this patent is extended or adjusted under 35 U.S.C. 154(b) by 209 days.

(21) Appl. No.: 10/603,634

(22) Filed: Jun. 25, 2003

(65) Prior Publication Data

US 2004/0266570 A1 Dec. 30, 2004

(51) Int. Cl.
*F16H 59/00* (2006.01)

(52) U.S. Cl. .......................... 474/19; 474/8
(58) Field of Classification Search ............. 474/8, 474/10, 11, 12, 19, 20, 21, 32, 14, 17; 192/52, 192/54, 93 A
See application file for complete search history.

(56) References Cited

U.S. PATENT DOCUMENTS

| | | | |
|---|---|---|---|
| 2,155,351 A | 4/1939 | Paulus | |
| 2,612,054 A | 9/1952 | Davis | |
| 2,928,286 A | 3/1960 | Davis | |
| 2,987,934 A | 6/1961 | Thomas | |
| 3,103,999 A | 9/1963 | Rabinow et al. | |
| 3,545,580 A | 12/1970 | Baer | |
| 3,625,079 A | 12/1971 | Hoff | |
| 3,747,721 A | 7/1973 | Hoff | |
| 3,824,867 A | 7/1974 | Brooks | |
| 3,850,050 A | 11/1974 | Lemmens | |
| 4,179,946 A | 12/1979 | Kanstoroom | |
| 4,196,641 A | 4/1980 | Vogel | |
| 4,380,444 A | 4/1983 | Dolza | |
| 4,575,363 A | 3/1986 | Burgess et al. | |
| 4,585,429 A | 4/1986 | Marier | |
| 4,969,856 A | 11/1990 | Miyata et al. | |
| 5,254,041 A | 10/1993 | Duclo | |
| 5,580,324 A * | 12/1996 | Landry | 474/19 |
| RE35,617 E | 9/1997 | Krivec | |
| 5,720,681 A | 2/1998 | Benson | |
| 5,967,286 A | 10/1999 | Hokanson et al. | |
| 6,120,399 A | 9/2000 | Okeson et al. | |
| 6,149,540 A | 11/2000 | Johnson et al. | |
| 6,155,940 A | 12/2000 | Templeton | |
| 6,186,915 B1 | 2/2001 | Dietl | |
| 6,248,035 B1 | 6/2001 | Bartlett | |
| 6,336,878 B1 | 1/2002 | Ehrlich et al. | |
| 6,342,024 B1 | 1/2002 | Walter et al. | |
| 6,354,419 B1 | 3/2002 | Dalbiez et al. | |
| 6,502,479 B1 | 1/2003 | Lee | |
| 6,837,353 B1 * | 1/2005 | Watt | 192/54.52 |
| 2001/0049312 A1 | 12/2001 | Warner et al. | |
| 2002/0019280 A1 | 2/2002 | Brown | |
| 2002/0032088 A1 | 3/2002 | Korenjak et al. | |
| 2002/0065156 A1 | 5/2002 | Younggren et al. | |
| 2002/0119846 A1 | 8/2002 | Kitai et al. | |
| 2002/0160867 A1 | 10/2002 | Katou | |
| 2004/0229723 A1* | 11/2004 | Kalies | 474/12 |
| 2004/0229724 A1* | 11/2004 | Kalies | 474/19 |

OTHER PUBLICATIONS

Duane Watt, "Found, The Missing Half of the Secondary Clutch", *Snow Tech*, Sep. 1997, pp. 114-119.
Three images of driven pulley system (before Jan. 17, 2003).

* cited by examiner

*Primary Examiner*—Vicky A. Johnson

(57) ABSTRACT

A driven pulley system for use in a torque converter of a vehicle is disclosed. The driven pulley system includes a cam. The cam is arranged to be removed from the driven pulley system for replacement of the cam.

21 Claims, 7 Drawing Sheets

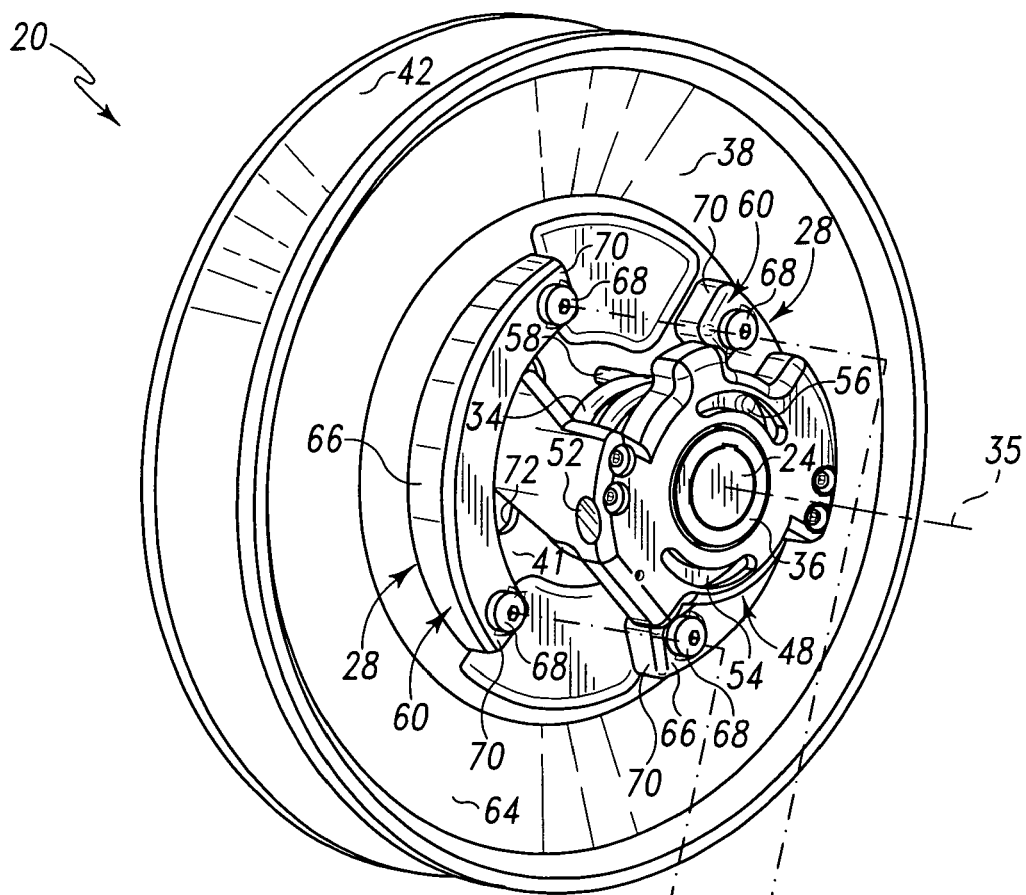
Fig. 2
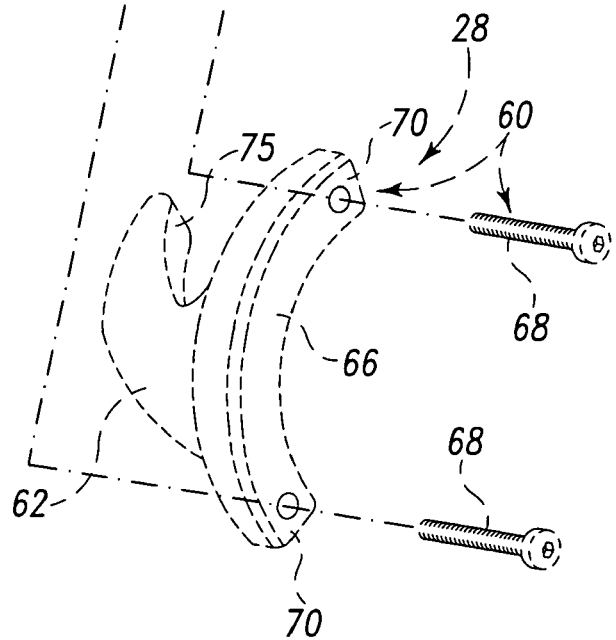

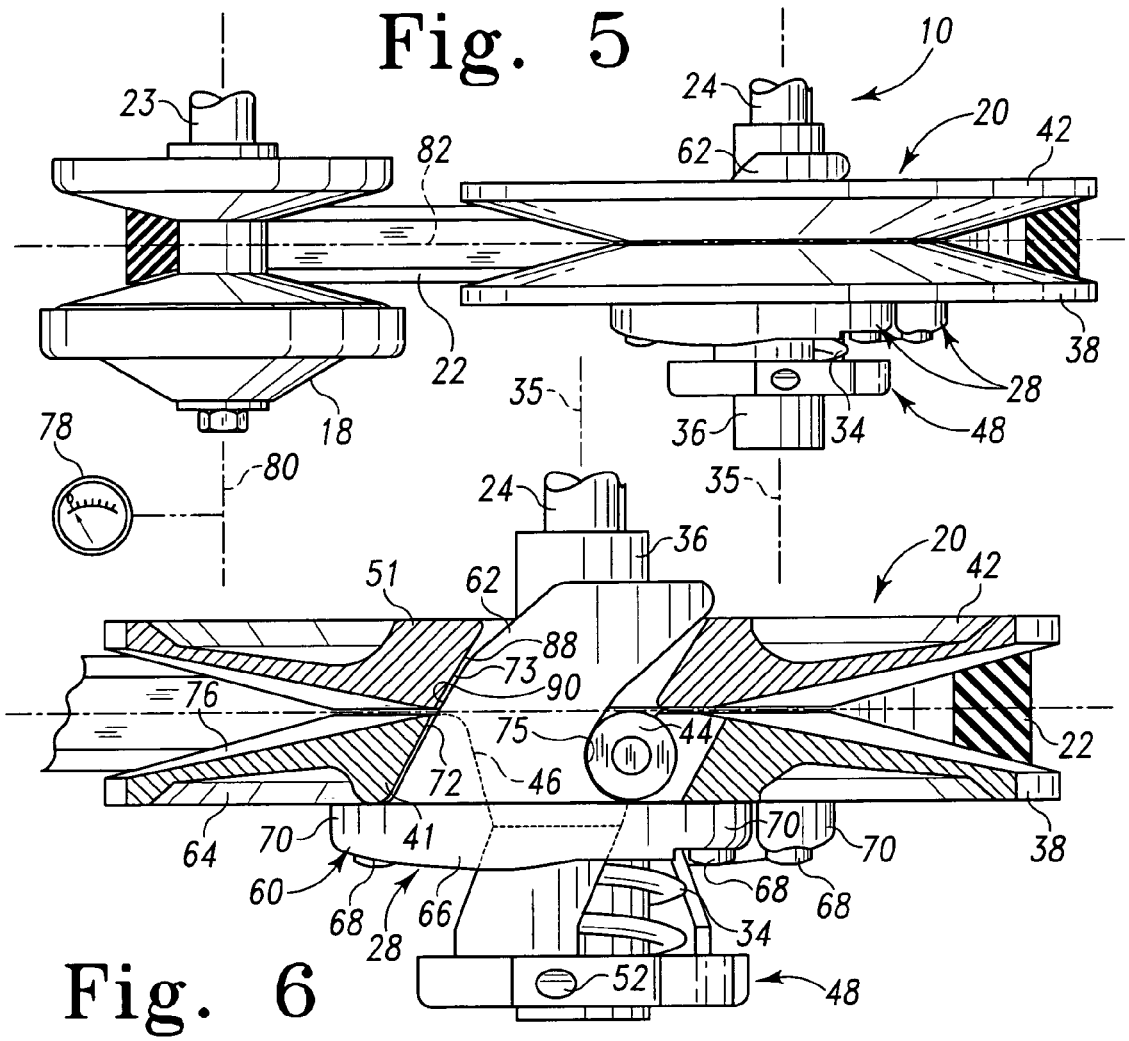
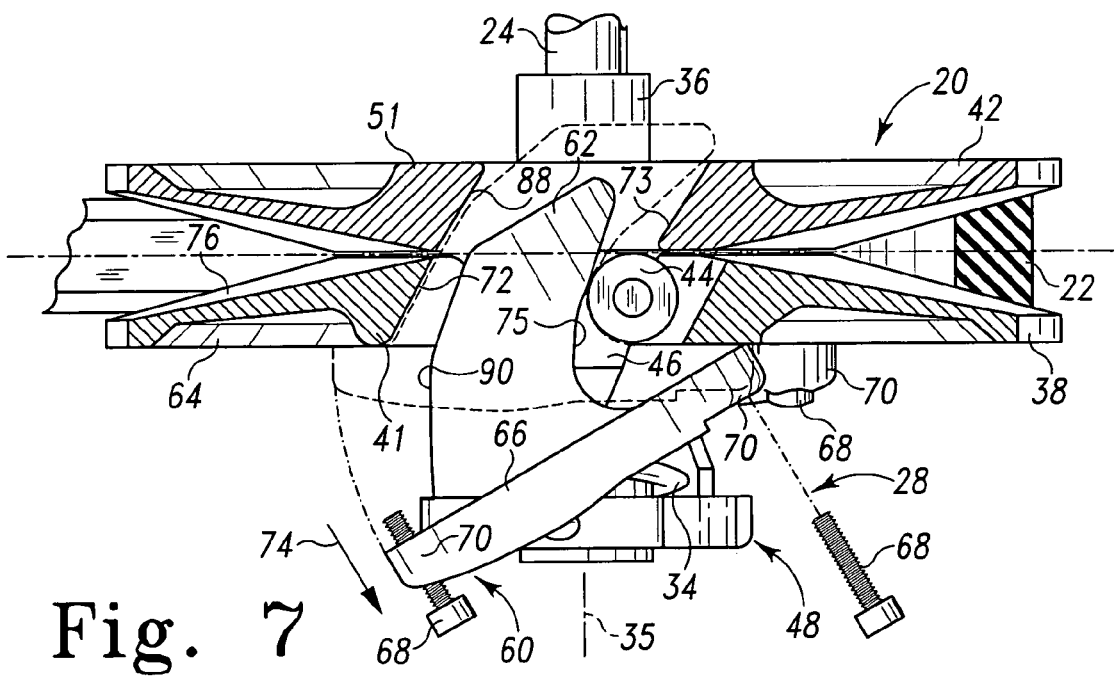

DRIVEN PULLEY SYSTEM WITH REMOVABLE CAM

BACKGROUND

The present disclosure relates to torque converters and more particularly to driven pulley systems for use in torque converters.

Torque converters are used on vehicles to promote vehicle engine performance. A torque converter is continuously variable in response to both engine speed (i.e., engine rpm) and torque (i.e., rotational resistance) encountered by a rotatable ground-engaging element (e.g., snowmobile track, wheel) of the vehicle.

A torque converter typically includes a belt trained about a driver pulley system and a driven pulley system. The driver pulley system is adjustable in response to engine speed. The driven pulley system is adjustable in response to torque. Adjustment of the driver and driven pulley systems varies the "shift ratio" of the torque converter to allow the engine to operate at a desired engine speed.

SUMMARY

According to the present disclosure, a driven pulley system is disclosed for use in a torque converter of a vehicle. The driven pulley system comprises a motion-transmitting fixed unit and a belt-tensioning movable unit. The fixed unit is arranged to be fixed to a rotatable output shaft of the vehicle for rotation with the output shaft to transmit motion between the output shaft and a belt included in the torque converter. The movable unit is arranged for movement relative to the fixed unit to tension the belt to promote engine speed responsiveness and torque responsiveness of the torque converter.

The fixed unit includes a cam and the movable unit includes a cam follower. The cam follower is arranged to follow the cam to cause rotation of the movable unit relative to the fixed unit to tension the belt upon axial movement of the movable unit relative to the fixed unit due to radially inward movement of the belt on the driven pulley system.

The cam is arranged to be removed from the driven pulley system for replacement of the cam. It may be desirable to replace the cam to change the performance of the torque converter and, thus, the performance of the vehicle.

Additional features and advantages of the apparatus will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which:

FIG. 2 is a perspective view of the driven pulley system showing one of its two cams in phantom and spaced apart from the other components included in the driven pulley system to indicate that the cams can be removed readily from the driven pulley system and replaced;

FIG. 5 is a top plan view showing the torque converter when the engine is at rest (or idling) so that the belt is positioned at a radially inner location on the driver pulley system and at a radially outer location on the driven pulley system;

FIG. 6 is an enlarged top plan view of the driven pulley system of FIG. 5, with portions broken away, showing a cam follower of the movable unit positioned against one of the cams of the fixed unit;

FIG. 7 is a view similar to FIG. 6 showing removal of the cam from the driven pulley system;

DETAILED DESCRIPTION

Figure 1:
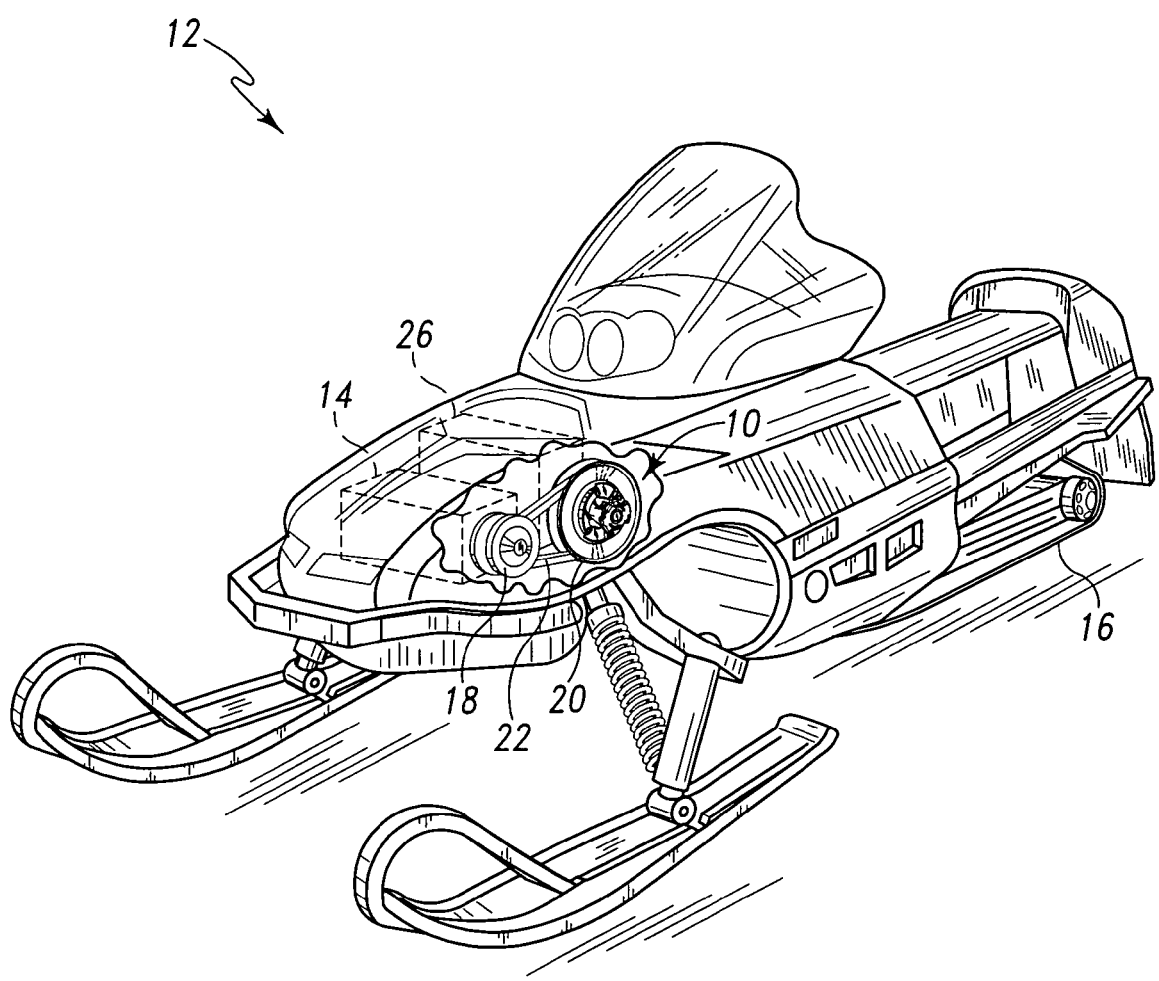
FIG. 1 is a perspective view of a snowmobile, with portions broken away, showing the snowmobile including a torque converter having a belt trained about a driver pulley system (on the left) coupled to an engine and a driven pulley system (on the right) for rotating gears in a gear box to drive a ground-engaging snowmobile track.

A torque converter 10 for use in a vehicle 12 is shown in FIG. 1. In the illustrated embodiment, the vehicle 12 is a snowmobile. It is within the scope of this disclosure for torque converter 10 to be used with other types of vehicles such as utility vehicles, all-terrain vehicles, motorcycles, mini-bikes, and go-karts, to name a few.

The torque converter 10 is continuously responsive to the speed of an engine 14 of the vehicle 12 and to torque encountered by a ground-engaging element 16 (e.g., a wheel, an endless snowmobile "track" as in illustrated embodiment, or other rotatable element) of the vehicle 12. Vehicle 12 moves along the ground as ground-engaging element 16 is rotated or turned.

The torque converter 10 is arranged to "upshift" to convert increased engine speed into an increased rotation rate of the element 16 and thus an increase in vehicle speed and is arranged to "downshift" to convert decreased engine speed into a decreased rotation rate of the element 16 and thus a decrease in vehicle speed. If the element 16 encounters increased torque (such as when going uphill), the torque converter 10 downshifts to allow the engine to operate at a desired engine speed.

The torque converter 10 includes a driver pulley system 18, a driven pulley system 20, and a belt 22 (e.g., a V-belt) trained about the systems 18, 20, as shown in FIG. 1. Driver pulley system 18 is coupled to a drive shaft 23 of engine 14 for rotation therewith. An exemplary driver pulley system which may be used as system 18 is disclosed in U.S. Pat. No. 6,155,940, the disclosure of which is hereby expressly incorporated by reference herein. The driven pulley system 20 is arranged to tension the belt 22 to promote engine speed responsiveness and torque responsiveness of the torque converter 10 and is coupled to an output shaft 24 (e.g., jackshaft) for transmission of motion between the belt 22 and the output shaft 24. The output shaft 24 operates a gear box 26 for rotation of the ground-engaging element 16.

Figure 3:
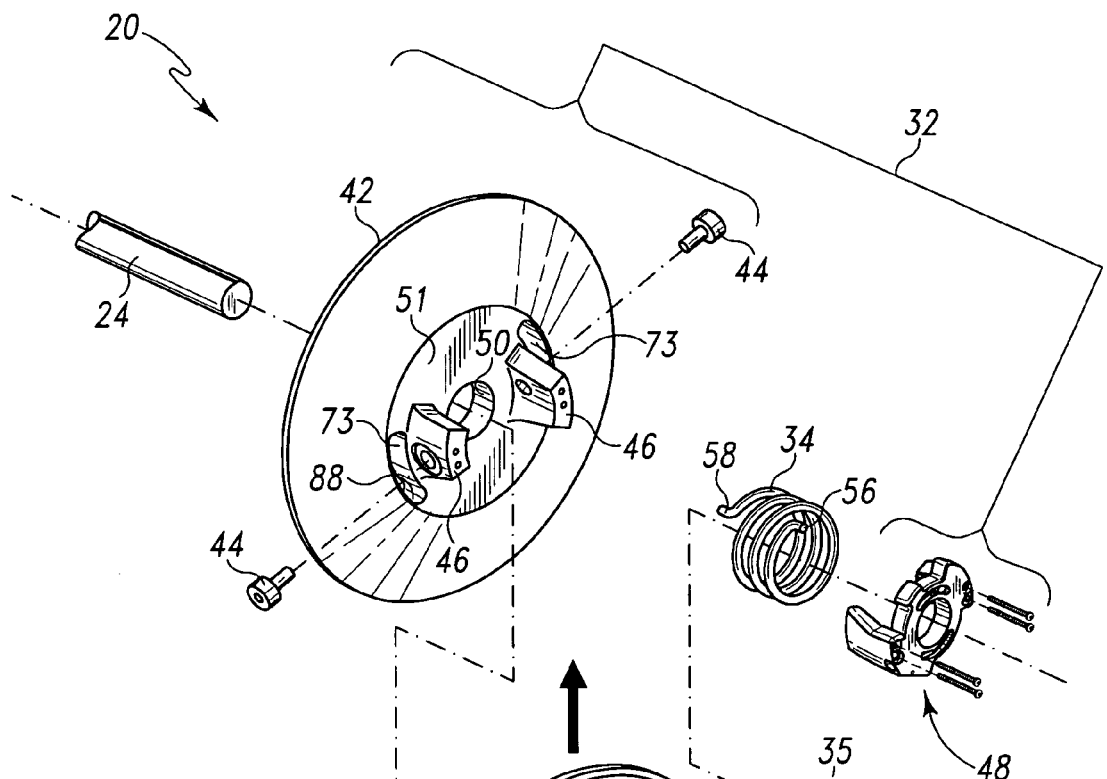
FIG. 3 is an exploded perspective view showing most of the components of the driven pulley system grouped into either (1) a motion-transmitting fixed unit (at bottom of page) that is to be fixed to an output shaft (at top left of page) of the snowmobile for rotation therewith to transmit motion between the output shaft and the belt or (2) a belt-tensioning movable unit (at top of page) to be mounted for movement relative to the fixed unit to tension the belt during operation of the torque converter and showing a spring to be mounted to the fixed and movable units.

The driven pulley system 20 uses a cam 28 shown in FIGS. 2 and 3 to tension the belt 22. In the illustrated embodiment, the driven pulley system 20 uses two such cams 28. Since the cams 28 are similar to one another in structure in function, the description herein of one cam 28 applies to the other cam 28 as well.

The cam 28 is readily removable from the driven pulley system 20 for replacement of the cam 28, as suggested in FIGS. 2 and 7. It may be desirable to replace the cam 28 to change the performance of the torque converter 10 and, thus, the engine 14 and vehicle 12. The removability of the cam 28 is discussed in more detail herein.

The driven pulley system 20 includes a motion-transmitting fixed unit 30, a belt-tensioning movable unit 32, and a coil spring 34, as shown in FIG. 3. The fixed unit 30 is fixed to the output shaft 24 for rotation therewith about a driven rotation axis 35 and is arranged to transmit motion between the belt 22 and the output shaft 24. The movable unit 32 is arranged for axial movement and rotation relative to the fixed unit 30 to tension the belt 22. The spring 34 is coupled to the fixed and movable units 30, 32 to bias the units 30, 32 to an at-rest configuration shown in FIGS. 5–7.

Components of the fixed unit 30 are shown in FIG. 3. The fixed unit 30 includes a shaft-receiving sleeve 36, an annular belt-engaging fixed flange 38, and the cams 28. The sleeve 36 is keyed to the output shaft 24 so as to be fixed thereto for rotation therewith. The sleeve 36 extends into a central hole 40 formed in the fixed flange 38. The fixed flange 38 is fixed to the sleeve 36 for rotation therewith. Each cam 28 is arranged to be removably mounted to a fixed flange hub portion 41 of the fixed flange 38.

Components of the movable unit 32 are shown in FIG. 3. The movable unit 32 includes an annular belt-engaging movable flange 42, a cam follower 44 for each cam 28, a cam-follower mount 46 for each cam follower 44, and a spring positioner 48. The fixed and movable flanges 38, 42 cooperate to receive the belt 22 therebetween for engagement therewith. The sleeve 36 extends through a central hole 50 formed in a movable flange hub portion 51 of the movable flange 42 such that the movable flange 42 is journaled on the sleeve 36 for rotation relative thereto. The cam-follower mounts 46 are fixed to and extend axially outwardly from the movable flange hub portion 51. Each cam follower 44 is mounted to and extends radially outwardly from its cam-follower mount 46 for engagement with a cam 28 to follow the cam 28 to cause the movable flange 42 to rotate relative to the fixed flange 38 to tension the belt 22 upon axial movement of the movable flange 42 away from the fixed flange 38 due to radially inward movement of the belt 22 between the flanges 38, 42. In the illustrated embodiment, each cam follower 44 is a roller and each cam-follower mount 46 is a tower mounted to the movable flange hub portion 51.

The spring positioner 48 is mounted to the cam-follower mounts 46 and arranged to retain the spring 34 between the spring positioner 48 and the fixed flange 38, as shown in FIGS. 2 and 6. The spring positioner 48 is further arranged to move the movable flange 42 axially along driven rotation axis 35 relative to the fixed flange 38 to adjust the squeeze of the belt 22 by the flanges 38, 42. The spring positioner 48 includes a worm (not shown) in a worm cavity 52 to rotate a worm gear 54 to wind or unwind the spring 34 somewhat to move the movable flange 42 axially along axis 35 relative to the fixed flange 38. The worm gear 54 rotates a movable spring end 56 received by the worm gear 54 relative to a fixed spring end 58 received by the fixed flange 38.

The driven pulley system 20 is arranged for removal of the cam 28 therefrom without additional disassembly of the driven pulley system 20, as shown in FIG. 7. In particular, the fixed and movable units 30, 32 are arranged to allow detachment of the cam 28 from the fixed flange 38 to remove the cam 28 from the driven pulley system 20 without additional disassembly of the driven pulley system 20. Stated otherwise, the fixed and movable units 30, 32 cooperate to provide means for allowing detachment of the cam 28 from the fixed flange 38 to remove the cam 28 from the driven pulley system 20 without additional disassembly thereof. There is no need to remove, loosen, detach, or otherwise disassemble any other components of the system 20 to allow removal of the cam 28. As such, the cam 28 can be removed and replaced quickly and with minimal effort.

The cam 28 includes a cam-body mount 60 and a cam body 62 mounted to the cam-body mount 60, as shown in FIGS. 3, 6, and 7. The cam-body mount 60 is arranged to facilitate quick and easy access thereto. The cam-body mount 60 is mounted to an axially outer side 64 of the fixed flange 38. The cam-body mount 60 is positioned radially outwardly from the spring 34, the spring positioner 48, the cam-follower mount 46, and the sleeve 36. The driven pulley system 20 does not cover the cam-body mount 60 axially outwardly therefrom.

The cam-body mount 60 includes a support member 66 and a pair of removable cam fasteners 68, as shown in FIGS. 2, 3, 4, and 7. Each cam fastener 68 is used to mount an end 70 of the member 66 to the axially outer side 64. In the illustrated embodiment, the support member 66 and, thus, the cam-body mount 62 are C-shaped and the cam fasteners 68 are screws arranged to be threaded to the fixed flange hub portion 41.

The cam body 62 is mounted to the support member 66, as shown in FIGS. 2, 3, 4, and 7. The cam body 62 extends axially inwardly from the support member 66 through a fixed flange channel 72 included in the fixed flange hub portion 41 into a movable flange channel 73 that is included in the movable flange hub portion 51 and extends from the axially outer side 64 to an axially inner side 76 of the fixed flange 38. The spring 34 normally biases a cam follower 44 into engagement with a helical follower engagement surface 75 of the cam body 62 to follow the surface 75 during axial movement of the movable flange 42 relative to the fixed flange 38 as explained in more detail herein.

The cam 28 can be removed from the driven pulley system 20 upon loosening of the cam fasteners 68, as shown in FIG. 7. Once the cam fasteners 68 are sufficiently loosened, a person can grip the support member 70 to move the cam 28 axially outwardly in direction 74 to withdraw the cam body 62 from the fixed and movable flange channels 72, 73. In this way, the cam 28 can be removed from the driven pulley system 20. A replacement cam can then be mounted to the driven pulley system 20 to change the performance characteristics of the torque converter 10 and, thus, the vehicle 12.

In operation, the driver and driven pulley systems 18, 20 are continuously adjustable in response to engine speed and torque experienced by ground-engaging element 16. The belt 22 moves radially inwardly and radially outwardly on the systems 18, 20 as the systems 18, 20 adjust.

Figure 4:
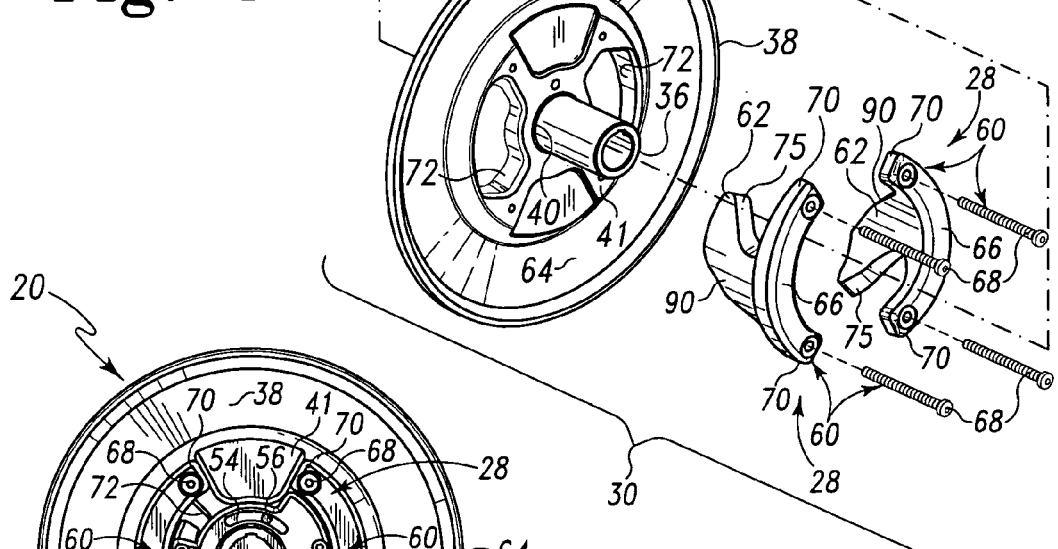
FIG. 4 is a front elevation view of the driven pulley system showing the cams mounted so that they are readily accessible for removal and replacement.

The torque converter 10 is "downshifted" when the engine 14 is at rest (or idling), as indicated by the speedometer 78 in FIG. 4. In this at-rest configuration, the belt 22 is positioned radially inwardly with respect to a driver rotation axis 80 and the belt 22 is positioned radially outwardly with respect to the driven rotation axis 35. In the driven pulley system 20, the spring 34 biases the movable flange 42 axially outwardly toward the fixed flange 38 to squeeze the belt 22 radially outwardly on the driven pulley system 20. The spring 34 also biases the movable unit 32 in torsion to press each cam follower 44 against a follower engagement surface 75. The cam followers 44 are positioned on a plane 82 defined by a belt centerline of the belt 22 in the at-rest configuration to minimize moments experienced by the driven pulley system 20 when the torque converter 10 begins to operate, as shown in FIG. 6.

Figure 8:
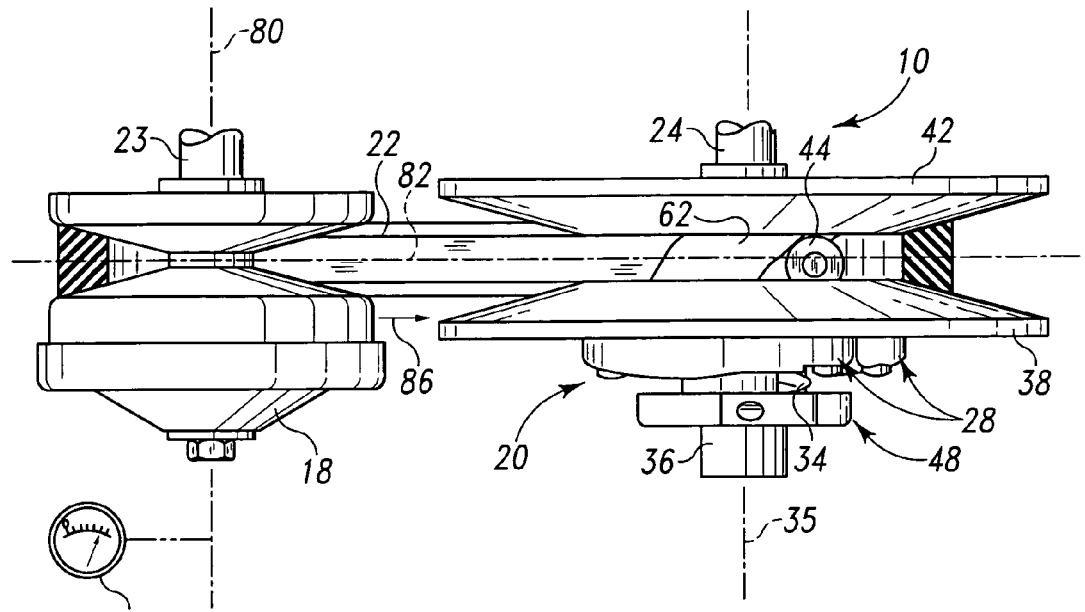
FIG. 8 is a top plan view showing the torque converter when the engine is operating above idle so that the belt rotates in a forward direction (indicated by the arrow located between the driver and driven pulley systems) and is positioned at a radially outer location on the driver pulley system and at a radially inner location on the driven pulley system.

As engine speed increases, the torque converter 10 upshifts, as shown, for example, in FIG. 8. As the torque converter 10 upshifts, the belt 22 moves radially outwardly on the driver pulley system 18 and radially inwardly on the driven pulley system 20.

Figure 9:
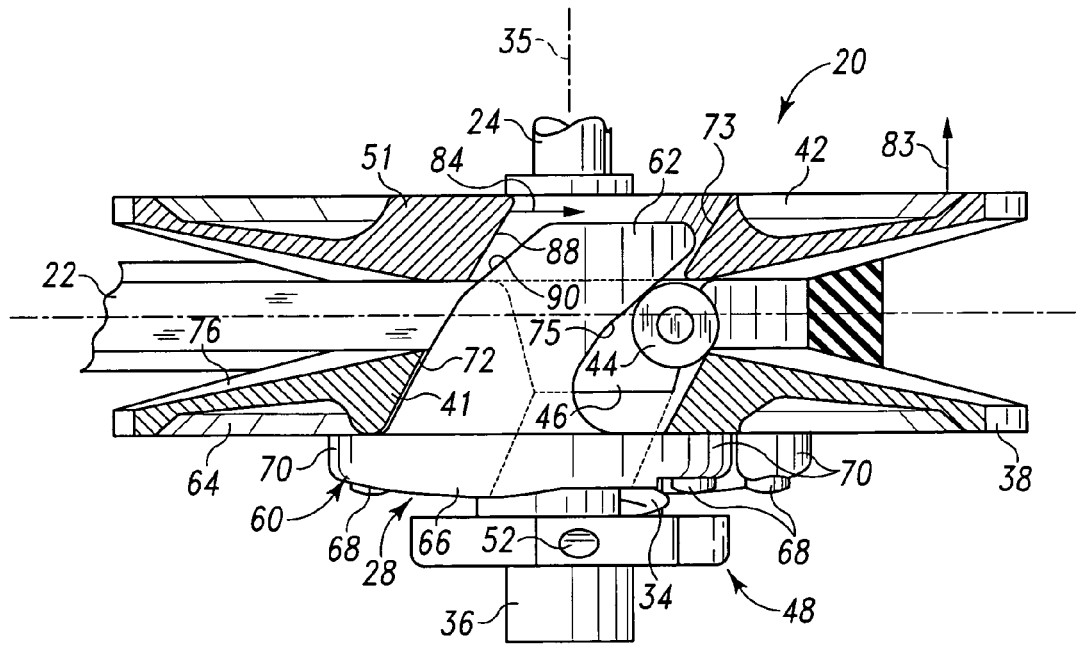
FIG. 9 is an enlarged top plan view of the driven pulley system of FIG. 8, with portions broken away, showing the belt having moved the movable flange axially inwardly away from the fixed flange thereby causing the cam follower to travel on the cam to rotate the movable flange relative to the fixed flange in a belt-tensioning, "reverse" direction opposite to the forward direction to tension the belt.

Radial inward movement of the belt 22 causes the movable flange 42 to move axially inwardly away in direction 83 from the fixed flange 38, as shown in FIG. 9. Axial inward movement of the movable flange 42 causes the movable flange 42 to rotate relative to the fixed flange 38 about the driven rotation axis 35. In particular, the movable flange 42 rotates relative to the fixed flange 38 in a belt-tensioning, "reverse" direction 84 which is opposite to a forward direction 86 of movement of the belt 22 and the fixed flange 38. Even the movable flange 42 continues to rotate in the forward direction 86 during such "reverse" rotation. However, in doing so, the movable flange 42 "lags behind" the fixed flange 38 so as to pull back on the belt 22 to tension it. Movement of the cam followers 44 on the follower engagement surfaces 75 of the cams 28 provide such belt-tensioning rotation of the movable flange 42 relative to the fixed flange 38.

Figure 10:
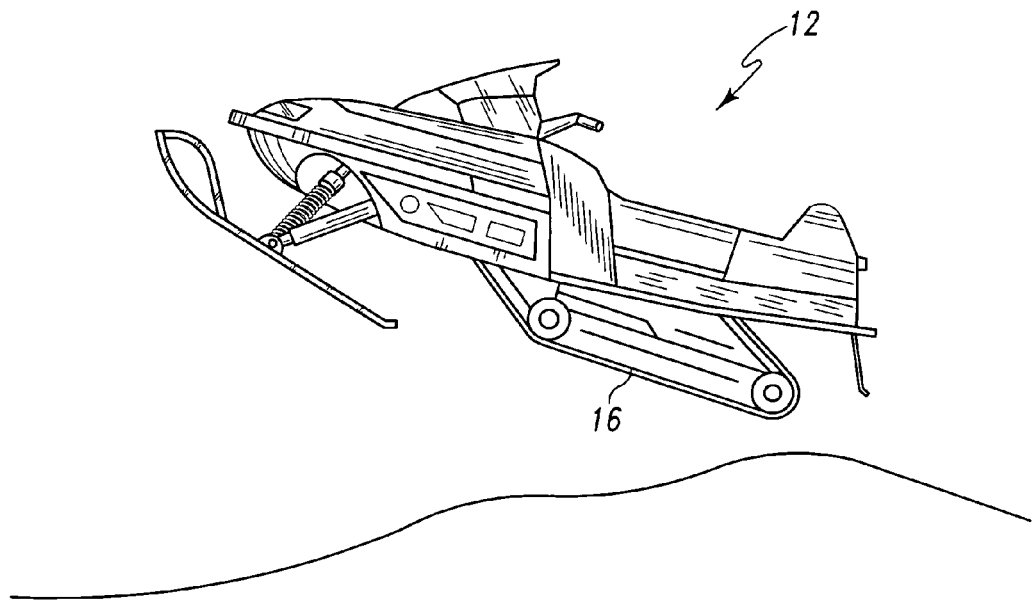
FIG. 10 is an elevation view showing the snowmobile after it has become airborne.
Figure 11:
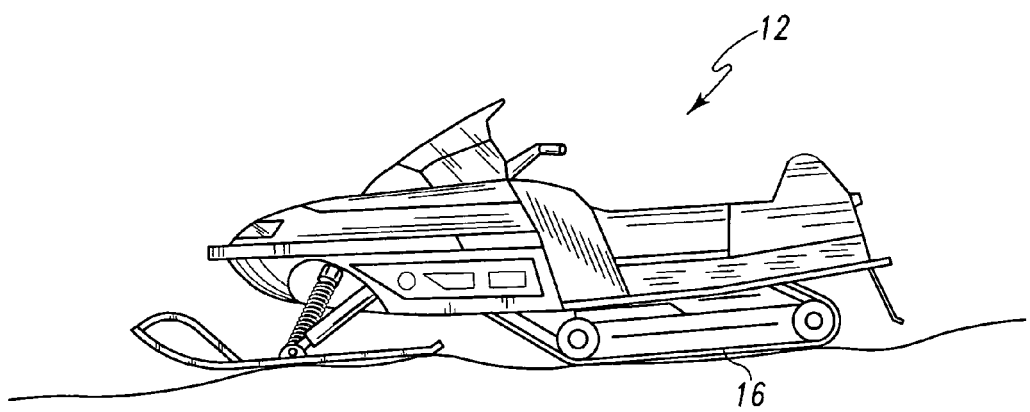
FIG. 11 is an elevation view showing the snowmobile landing on the ground after having been airborne.
Figure 12:
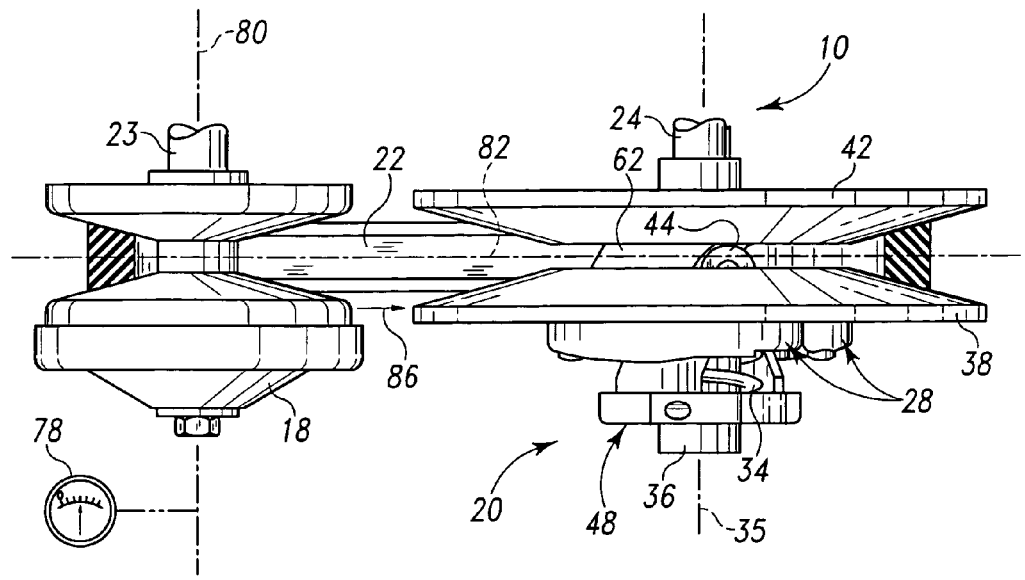
FIG. 12 is a top plan view showing the torque converter after a sudden increase in the rotation rate of the output shaft due to landing of the snowmobile on the ground.

The cams 28 normally remains in contact with the cam follower 44 during operation of the torque converter 10. However, in some circumstances, the cam 28 may be jolted away from the cam follower 42 in the forward direction 86. This may occur, for example, when the vehicle 12 lands on the ground after having been airborne, as shown in FIGS. 10 and 11. The impact of the vehicle 12 on the ground can suddenly increase the rotation rate of the output shaft 24 in the forward direction 86. Because the fixed unit 38 is fixed to the output shaft 24, the cams 28 are caused to rotate with the output shaft 24 in the forward direction 86 away from the cam followers 44. Such a situation may be referred to as "backlash" and is shown in FIGS. 12 and 13.

Figure 13:
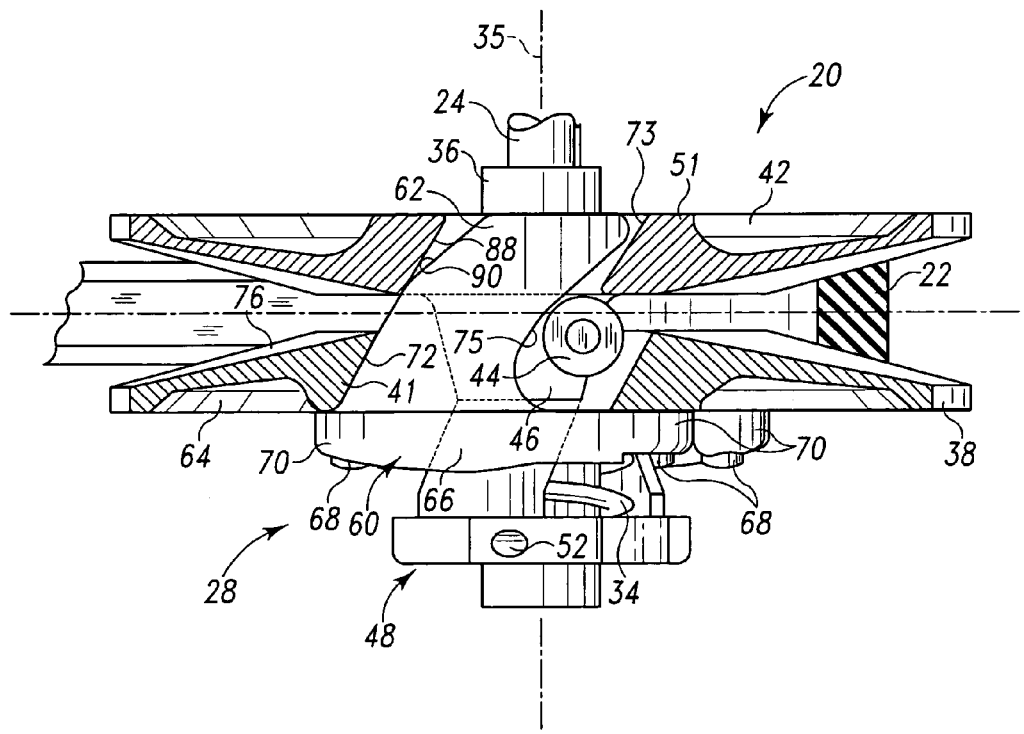
FIG. 13 is an enlarged top plan view of the driven pulley system of FIG. 12, with portions broken away, showing engagement between the cam and a rotation limiter included in a channel of the movable flange to limit rotation of the cam away from cam follower in the forward direction due to the sudden increase in the rotation rate of the output shaft when the snowmobile lands on the ground.

Each movable flange channel 73 includes a helical surface which may be referred to as a rotation limiter 88, as shown with respect to one rotation limiter 88 in FIG. 13. Helical limiter engagement surfaces 90 of the cams 28 rotate into engagement with the rotation limiters 88 during backlash. In this way, the rotation limiters 88 limit rotation of the cams 28 away from the cam followers 44 in the forward direction 86 during backlash. The duration of impact between the limiter engagement surfaces 90 and the rotation limiters 28 is brief. After the impact, the torsion biasing force of the spring 34 moves the cams 28 back into engagement with the cam followers 44.

There is normally a small clearance between the limiter engagement surfaces 90 and the rotation limiter 88. This clearance may be, for example, about 0.125 inch (3 mm). The clearance is small so that the cams 28 do not travel very far away from the cam followers 44 during backlash. In this way, the force of impact between the limiter engagement surfaces 90 and the rotation limiters 88 is minimized to avoid damage to the driven pulley system 20. The helical shape of the limiter engagement surfaces 90 and the rotation limiters 88 helps limit the clearance between the surfaces 90 and rotation limiters 88 regardless of the position of the movable flange 42.

The invention claimed is:

1. A driven pulley system for use in a torque converter of a vehicle, the driven pulley system comprising
a motion-transmitting fixed unit arranged to be fixed to a rotatable output shaft of the vehicle for rotation therewith to transmit motion between the output shaft and a belt included in the torque converter, the fixed unit including a fixed flange and a removable cam mounted to the fixed flange, and
a belt-tensioning movable unit arranged for movement relative to the fixed unit to tension the belt, the movable unit including a movable flange and a cam follower, the fixed flange and the movable flange cooperating to receive the belt therebetween for engagement therewith, the cam follower being arranged to follow the cam to cause rotation of the movable flange relative to the fixed flange to tension the belt upon axial movement of the movable flange away from the fixed flange, and
means for allowing detachment of the cam from the fixed flange to remove the cam from the driven pulley system while maintaining the cooperation of the fixed and movable flanges to receive the belt therebetween for engagement therewith.

2. The driven pulley system of claim 1, wherein the fixed flange includes a fixed flange channel, the movable flange includes a movable flange channel, and the cam extends through the fixed flange channel into the movable flange channel.

3. The driven pulley system of claim 1, wherein the fixed flange includes an axially outer side, an axially inner side positioned between the axially outer side and the movable flange, and a fixed flange channel extending from the axially outer side to the axially inner side, the cam includes a cam-body mount mounted to the axially outer side and a cam body mounted to the cam-body mount and extending through the fixed flange channel.

4. The driven pulley system of claim 3, wherein the fixed and movable units do not cover the cam-body mount axially outwardly therefrom to facilitate access thereto for removal of the cam from the driven pulley system.

5. The driven pulley system of claim 3, further comprising a spring, wherein the movable unit includes a spring positioner arranged to retain the spring between the spring positioner and the fixed flange and the cam-body mount is positioned radially-outwardly from the spring and the spring positioner.

6. The driven pulley system of claim 1, further comprising a spring, wherein the movable unit includes a spring positioner arranged to retain the spring between the spring positioner and the fixed flange, and the cam being removable from the fixed unit without removing the spring positioner from the movable unit.

7. A driven pulley system for use in a torque converter of a vehicle, the driven pulley system comprising a motion-transmitting fixed unit arranged to be fixed to a rotatable output shaft of the vehicle for rotation therewith to transmit motion between the output shaft and a belt included in the torque converter, the fixed unit including a fixed flange and a removable cam mounted to the fixed flange, and a belt-tensioning movable unit arranged for movement relative to the fixed unit to tension the belt, the movable unit including a movable flange and a cam follower, the fixed flange and the movable flange cooperating to receive the belt therebetween for engagement therewith, the cam follower being arranged to follow the cam to cause rotation of the movable flange relative to the fixed flange to tension the belt upon axial movement of the movable flange away from the fixed flange, the fixed and movable units being arranged to permit removal of at least one fastener holding the cam and to allow detachment of the cam from the fixed flange to remove the cam from the driven pulley system while maintaining the cooperation of the fixed and movable flanges to receive the belt therebetween for engagement therewith.

8. The driven pulley system of claim 7, wherein the fixed flange includes a fixed flange channel and the cam extends through the fixed flange channel.

9. The driven pulley system of claim 8, wherein the movable flange includes a movable flange channel and the cam extends into the movable flange channel.

10. The driven pulley system of claim 8, wherein the fixed flange includes an axially outer side and an axially inner side positioned between the axially outer side and the movable flange, the fixed flange channel extends from the axially outer side to the axially inner side, and the cam includes a cam-body mount mounted to the axially outer side for removal therefrom and a cam body that is mounted to the cam-body mount and extends through the fixed flange channel for engagement with the cam follower.

11. The driven pulley system of claim 10, wherein the movable flange includes a movable flange channel and the cam body is arranged to extend into and engage the movable flange channel to limit rotation of the cam away from the cam follower due to an increased rotation rate of the output shaft.

12. The driven pulley system of claim 10, wherein the cam-body mount is C-shaped.

13. The driven pulley system of claim 10, further comprising a spring, wherein the movable unit includes a spring positioner and a cam-follower mount, the spring positioner is arranged to retain the spring between the spring positioner and the fixed flange, the cam-follower mount is mounted to the movable flange, the cam follower and the spring positioner are mounted to the cam-follower mount, the spring positioner and the cam-follower mount are positioned radially inwardly from the cam, and at least one of the spring positioner and the cam-follower mount is positioned in the fixed flange channel.

14. The driven pulley system of claim 7, further comprising a spring, wherein the movable unit includes a spring positioner arranged to retain the spring between the spring positioner and the fixed flange, and the cam is positioned radially outwardly from the spring and the spring positioner.

15. The driven pulley system of claim 7, wherein each of the fixed flange and the movable flange includes a channel, the cam includes a cam body which the cam follower is arranged to follow, a C-shaped support member, and a fastener fastening the support member to an axially outer side of the fixed flange, and the cam body is mounted to and extends axially inwardly from the support member into each of the channels.

16. A driven pulley system for use in a torque converter of a vehicle, the driven pulley system comprising a motion-transmitting fixed unit arranged to be fixed to a rotatable output shaft of the vehicle for rotation therewith to transmit motion between the output shaft and a belt included in the torque converter, the fixed unit including a fixed flange and a cam, the fixed flange including an axially outer side, an axially inner side, and a fixed flange channel extending from the axially outer side to the axially inner side, and a belt-tensioning movable unit arranged for movement relative to the fixed unit to tension the belt, the movable unit including a movable flange positioned axially inwardly from the fixed flange and a cam follower, the fixed flange and the movable flange cooperating to receive the belt therebetween for engagement therewith, the cam follower being arranged to follow the cam to cause rotation of the movable flange relative to the fixed flange to tension the belt upon axial movement of the movable flange away from the fixed flange, the cam being mounted on the axially outer side of the fixed flange and extending through the fixed flange channel for engagement with the cam follower.

17. The driven pulley system of claim 16, wherein the fixed and movable units are arranged to allow detachment of the cam from the axially outer side to remove the cam from the driven pulley system without additional disassembly of the driven pulley system.

18. The driven pulley system of claim 16, wherein the movable flange includes a movable flange channel and the cam extends into the movable flange channel.

19. The driven pulley system of claim 16, further comprising a spring, wherein the movable unit includes a spring positioner arranged to retain the spring between the spring positioner and the fixed flange and the cam is positioned radially outwardly from the spring and the spring positioner.

20. The driven pulley system of claim 16, wherein the cam includes a cam-body mount and a cam-body mounted to the cam-body mount, the cam-body mount is mounted to the axially outer side, and the cam body extends axially inwardly from the cam-body mount through the fixed flange channel for engagement with the cam follower.

21. The driven pulley system of claim 20, wherein the fixed and movable units do not cover the cam-body mount axially outwardly from the cam-body mount.

* * * * *

UNITED STATES PATENT AND TRADEMARK OFFICE
CERTIFICATE OF CORRECTION

PATENT NO. : 7,081,057 B2  
APPLICATION NO. : 10/603634  
DATED : July 25, 2006  
INVENTOR(S) : Ken Edward Kallies Page 1 of 1

It is certified that error appears in the above-identified patent and that said Letters Patent is hereby corrected as shown below:

Title page, item [73] should read
--Hoffco/Comet Industries, Inc.
Richmond, Indiana
US--

Signed and Sealed this

Thirtieth Day of January, 2007

JON W. DUDAS
*Director of the United States Patent and Trademark Office*